(12) United States Patent
Kneubühl et al.

(10) Patent No.: US 10,041,826 B2
(45) Date of Patent: Aug. 7, 2018

(54) FORCE SENSOR DEVICE FOR DETECTING THE WEIGHT OF A VEHICLE

(71) Applicant: HAENNI INSTRUMENTS AG, Kirchberg (CH)

(72) Inventors: Daniel Kneubühl, Kerzers (CH); Christian Maurer, Bern (CH)

(73) Assignee: HAENNI INSTRUMENTS AG, Kirchberg (CH)

( * ) Notice: Subject to any disclaimer, the term of this patent is extended or adjusted under 35 U.S.C. 154(b) by 137 days.

(21) Appl. No.: 14/953,893

(22) Filed: Nov. 30, 2015

(65) Prior Publication Data

US 2016/0153828 A1    Jun. 2, 2016

(30) Foreign Application Priority Data

Dec. 1, 2014   (EP) ..................... 14195671

(51) Int. Cl.
| *G01L 1/04* | (2006.01) |
| *G01G 19/03* | (2006.01) |
| *G01L 1/16* | (2006.01) |
| *G01G 19/02* | (2006.01) |
| *G01G 3/13* | (2006.01) |
| *G01L 1/14* | (2006.01) |

(52) U.S. Cl.
CPC ......... *G01G 19/035* (2013.01); *G01G 19/022* (2013.01); *G01L 1/16* (2013.01); *G01G 3/13* (2013.01); *G01G 19/02* (2013.01); *G01G 19/024* (2013.01); *G01G 19/025* (2013.01); *G01G 19/027* (2013.01); *G01G 19/03* (2013.01); *G01L 1/04* (2013.01); *G01L 1/146* (2013.01)

(58) Field of Classification Search
CPC .. G01G 19/024; G01G 19/022; G01G 19/027; G01G 19/02; G01G 19/025; G01G 19/03; G01G 19/035; G01G 3/13; G01L 1/04; G01L 1/146
USPC ...... 177/132, 134; 200/86 A, 85 R; 701/117, 701/118; 702/175; 73/768, 862, 625, 73/862.621
See application file for complete search history.

(56) References Cited

U.S. PATENT DOCUMENTS

| 3,747,715 | A | * | 7/1973 | Nordstrom | ............. | G01G 19/04 177/134 |
| 4,007,800 | A | * | 2/1977 | Janach | ..................... | G01G 5/04 177/209 |
| 4,799,381 | A | * | 1/1989 | Tromp | ................. | G01G 19/024 177/211 |
| 4,963,705 | A | * | 10/1990 | Broderick | .............. | G08G 1/015 200/302.1 |
| 5,260,520 | A | * | 11/1993 | Muhs | ....................... | G01G 9/00 177/1 |

(Continued)

FOREIGN PATENT DOCUMENTS

| EP | 1 019 684 B1 | 11/2005 |
| WO | 01/27569 A1 | 4/2001 |

(Continued)

*Primary Examiner* — Jonathan Dunlap
(74) *Attorney, Agent, or Firm* — McGlew and Tuttle, P.C.

(57) ABSTRACT

A force sensor device (200) for detecting a weight of a vehicle. The force sensor device (200) includes an elongated sensor mount (2) with a plurality of hollow sections (3) arranged at least partially overlappingly in the elongated sensor mount (2). A force strip sensor (1) is arranged in each hollow section (3).

18 Claims, 6 Drawing Sheets

(56) References Cited

U.S. PATENT DOCUMENTS

| | | | | |
|---|---|---|---|---|
| 5,265,481 A * | 11/1993 | Sonderegger | ............ | G01G 3/13 177/210 C |
| 5,450,077 A * | 9/1995 | Tyburski | ................ | E01F 11/00 200/86 A |
| 5,461,924 A * | 10/1995 | Calderara | ................ | G01G 3/13 73/768 |
| 5,501,111 A * | 3/1996 | Sonderegger | ............ | G01G 3/13 29/25.35 |
| 5,520,056 A * | 5/1996 | Buisson | ................... | G08G 1/02 340/933 |
| 5,710,558 A * | 1/1998 | Gibson | ................... | G08G 1/02 200/85 R |
| 5,942,681 A * | 8/1999 | Vollenweider | ......... | G01L 17/005 73/146 |
| 5,959,259 A * | 9/1999 | Beshears | .............. | G01G 19/022 177/132 |
| 5,998,741 A * | 12/1999 | Beshears | ................ | G08G 1/015 177/133 |
| 6,130,627 A * | 10/2000 | Tyburski | ................ | G08G 1/042 200/86 A |
| 6,326,902 B1 * | 12/2001 | Tyburski | ................ | G08G 1/02 200/86 A |
| 6,417,785 B1 * | 7/2002 | Tyburski | ................ | G08G 1/02 340/933 |
| 6,459,050 B1 * | 10/2002 | Muhs | ................... | G01G 19/022 177/133 |
| 6,484,586 B1 * | 11/2002 | Dutoit | .................... | G01L 9/007 73/722 |
| 6,744,378 B1 * | 6/2004 | Tyburski | ................ | E01F 11/00 200/86 A |
| 6,748,869 B1 * | 6/2004 | Boyer | ................... | F42C 11/007 102/206 |
| 6,917,308 B2 * | 7/2005 | Hilliard | ................. | G08G 1/015 200/86 A |
| 7,022,925 B2 * | 4/2006 | Reed | ....................... | G08G 1/02 200/61.22 |
| 7,153,383 B2 * | 12/2006 | Gebert | ..................... | G01G 7/06 156/249 |
| 7,423,225 B1 * | 9/2008 | Kroll | ..................... | G01G 21/22 177/132 |
| 7,926,357 B2 * | 4/2011 | Dore | ..................... | G01L 5/0038 73/803 |
| 8,080,742 B2 * | 12/2011 | Bergan | ................. | G01G 19/022 177/132 |
| 8,312,766 B2 * | 11/2012 | Pingel | .................... | G01B 11/22 73/146.5 |
| 8,935,042 B2 * | 1/2015 | Taylor | ..................... | G01L 1/146 701/34.4 |
| 9,304,032 B2 * | 4/2016 | Cornu | ..................... | G01G 3/13 |
| 9,347,816 B2 * | 5/2016 | Cornu | ..................... | G01G 3/13 |
| 9,488,517 B2 * | 11/2016 | Cornu | .................. | G01G 19/024 |
| 2006/0137914 A1 * | 6/2006 | Hodac | .................. | G01G 19/024 177/132 |
| 2010/0292953 A1 * | 11/2010 | Pingel | .................. | G01L 17/005 702/138 |
| 2011/0232974 A1 * | 9/2011 | Abercrombie | ....... | G01G 19/024 177/133 |
| 2014/0345955 A1 * | 11/2014 | Cornu | ..................... | G01G 3/13 177/180 |
| 2015/0075297 A1 * | 3/2015 | Cornu | ..................... | G01G 3/13 73/862.642 |
| 2016/0187183 A1 * | 6/2016 | Cornu | .................. | G01G 19/024 177/132 |

FOREIGN PATENT DOCUMENTS

| | | |
|---|---|---|
| WO | 02/23504 A1 | 3/2002 |
| WO | 2013/056381 A1 | 4/2013 |
| WO | 2013/071452 A1 | 5/2013 |

\* cited by examiner

Fig. 6c

FORCE SENSOR DEVICE FOR DETECTING THE WEIGHT OF A VEHICLE

CROSS REFERENCE TO RELATED APPLICATIONS

This application claims the benefit of priority under 35 U.S.C. § 119 of European Patent Application 14 195 671.4 filed Dec. 1, 2014, the entire contents of which are incorporated herein by reference.

FIELD OF THE INVENTION

The present invention pertains to a force sensor device, especially for detecting the weight of a vehicle, and to a strip sensor device with such a force sensor.

BACKGROUND OF THE INVENTION

Force sensors are currently used mainly in wheel load scales. A plurality of sensors are packed into a metallic protective member in a grid-like manner and sealed against ambient effects for protection, because the housings of the wheel load scales cannot be made as sufficiently sealed housings for reasons of measurement.

The force sensors are usually designed as aluminum hollow sections and with a plurality of quartz sensors or wire strain gauge measuring elements (DMS). These variants have the drawback that they are highly sensitive to bending and torsion. The sensors may even become damaged in case of overload. In addition, the preparation of a sensor element is very expensive because of the plurality of sensors.

SUMMARY OF THE INVENTION

An object of the present invention is to provide a simple and robust design for a strip sensor. In particular, the strip sensor shall be composed of a hollow section and force sensors.

According to the invention, a force sensor device is provided for detecting a weight of a vehicle. The force sensor device comprises an elongated sensor mount, a plurality of hollow sections and a force strip sensor. The hollow sections are arranged at least partially overlapping in the elongated sensor mount. One of the force strip sensors is arranged in each of the hollow sections.

According to another aspect of the invention, a strip sensor device is provided comprising an elongated hollow section housing and a force sensor device arranged in the hollow section housing. The force sensor device comprises an elongated sensor mount, a plurality of hollow sections and a force strip sensor. The hollow sections are arranged at least partially overlapping in the elongated sensor mount. One of the force strip sensors is arranged in each of the hollow sections.

The present invention is based on the idea of using force sensors to compose strip sensors. Such sensors are used especially for WIM (Weigh in Motion, dynamic weighing) applications. These are usually designed as aluminum hollow sections and are provided with a plurality of quartz sensors or wire strain gauge measuring elements (DMS).

A mounting and force application element or force sensor device comprises a narrow base plate and alternatingly arranged thin tubes, which can be used as supports for the force sensors. Any desired embodiment variant can be embodied by varying the number and length of tubes. The measuring element or the mounting and force application element can be fitted into a hollow section in a simple manner by preassembly and does not have to be fixed rigidly, as in the case of the usual technology. Floating mounting of the measuring elements makes the latter insensitive to shock, bending and torsional loads. A strip sensor with the mounting and force application element may have a continuously increasing and decreasing sensitivity in the direction of travel. Elastic edge zones of the strip sensor can uncouple the measuring zone and compensate differential stresses in case of installation in road surfaces.

Such strip sensors have the advantage that these have hardly any sensitivity to bending and torsion if at all. The sensors are not damaged even in case of overload. A strip sensor can thus be prepared in a very simple manner.

The strip sensor can thus be installed either as a mobile solution on a (road) surface or as a stationary unit on the road surface.

According to a first aspect, the present invention pertains to a force sensor device for detecting the weight of a vehicle, with an elongated sensor mount; and to a plurality of hollow sections arranged at least partially overlapping in the elongated sensor mount, a force strip sensor being arranged in each hollow section.

This has the advantage that such a force sensor device can be designed as a simple and robust design.

According to one embodiment of the force sensor device, the overlappingly arranged hollow sections extend in a direction in which the elongated sensor mount extends.

This has the advantage that any desired lengths can be embodied because of the overlapping arrangement.

According to one embodiment of the force sensor device, the sensitivity of the force strip sensors is approximately constant along the direction in which the elongated sensor mount extends.

This has the advantage that the display of weight is always equal, independently from the location at which a vehicle is traveling over the force sensor device.

According to one embodiment of the force sensor device, the sensitivity of the force strip sensors is not uniform in the radial direction of the elongated sensor mount.

This has the advantage that the driving up onto the force sensor device can be weighted differently than the state in which the vehicle is located with both wheels directly over the force sensor device. The force sensor device can thus perform a more accurate determination of the weight.

According to one embodiment of the force sensor device, the sensitivity of the force strip sensors decreases continuously from a central position to an edge position in the radial direction of the elongated sensor mount.

This has the advantage that the process of driving up from the edge position to the central position and the process of driving away from the central position to the edge position can be weighted lower than the state in which the vehicle is located directly in the central position of the force sensor device. The force sensor device can thus perform a more accurate determination of the weight.

According to one embodiment of the force sensor device, the force strip sensors are placed or bonded into the hollow sections.

This has the advantage that the force strip sensors can become displaced or at least stretch flexibly, so that the force strip sensors will not be damaged in case of a heavy load.

According to one embodiment of the force sensor device, the plurality of overlappingly arranged hollow sections have a first hollow section, a second hollow section and a third hollow section, the first hollow section and the second hollow section being arranged in a row at spaced locations from one another, and the third hollow section being arranged laterally next to the first hollow section and the second hollow section and at least partially overlapping the first hollow section and the second hollow section.

This has the advantage that any desired lengths of the force sensor device can be embodied with such an arrangement, so that this device can be installed in roadways of different widths.

According to one embodiment of the force sensor device, the hollow sections have connection interfaces each at both ends of the hollow section for an electrical connection of the force strip sensors.

This has the advantage that the force strip sensors can be coupled with one another.

According to one embodiment of the force sensor device, the force strip sensors are connected electrically in series or parallel.

This has the advantage that many short force strip sensors can be connected to form a long force strip sensor, so that the manufacturing costs can be kept low. Furthermore, short force strip sensors can be manufactured more easily because they are less sensitive to bending and torsional loads as well as to other loads occurring during manufacture.

According to one embodiment of the force sensor, hollow sections are formed by tubes, especially by thin-walled tubes, with a circular cross section or with a square cross section.

This has the advantage that the hollow sections can be manufactured easily and in a cost-effective manner.

According to a second aspect, the present invention pertains to a strip sensor device, with an elongated hollow section housing; and with at least one force sensor device according to the first aspect of the present invention or one of its embodiments which is arranged in the hollow section housing.

This has the advantage that such a strip sensor device can have a simple and robust design. The design with a hollow section housing and force sensors integrated therein is especially suitable for installation in the road surface.

According to one embodiment of the strip sensor device, the elongated sensor mount of the at least one force sensor device extends along a longitudinal direction of the hollow section housing.

This has the advantage that the hollow section housing can be installed in the roadway at right angles to the roadway and the strip sensor device can thus reliably measure the weight of the vehicles traveling over it.

According to one embodiment, the strip sensor device comprises a guide element arranged in the hollow section housing along the longitudinal direction of the hollow section housing, the at least one force sensor device being mounted displaceably in the guide element.

This has the advantage that the force sensor device can easily be introduced into the guide element and is insensitive to mechanical stresses.

According to one embodiment of the strip sensor device, the hollow section housing has elastic edge zones.

This has the advantage that the strip sensor device can be installed floatingly in the roadway and therefore can easily compensate mechanical stresses because of the elastic edge zones.

According to one embodiment of the strip sensor device, the elastic edge zones of the hollow section housing have sinusoidal, U-shaped or rectangular expansion joints.

This has the advantage that such expansion joints can easily be prepared.

Further exemplary embodiments will be explained with reference to the attached drawings. Reference will be made in the following detailed description to the attached drawings, which form a part of this description and in which specific embodiments are shown as an illustration, according to which the present invention can be embodied. It is apparent that other embodiments may be used and structural or logical changes may be made without departing from the concept of the present invention. The following detailed description should not therefore be considered in a limiting sense. Furthermore, it is apparent that the features of the different exemplary embodiments being described here may be combined with one another unless specified otherwise.

The aspects and embodiments will be described with reference to the drawings, identical reference numbers designating, in general, identical elements. Numerous specific details will be given in the following description for the purposes of explanation in order to facilitate thorough understanding of one or more aspects of the present invention. However, it may be apparent to a person skilled in the art that one or more aspects or embodiments may be designed with a lower degree of the specific details. Prior-art structures and elements will be shown in other cases in a schematic form in order to facilitate the description of one or more aspects or embodiments. It is apparent that other embodiments may be used and structural or logical changes may be made without departing from the concept of the present invention.

Even though a certain feature or a certain aspect of an embodiment may have been disclosed with reference to only one of several implementations, such a feature or such an aspect may, in addition, be combined with one or more other features or aspects of the other implementations, as it may be desirable and advantageous for a given or certain application. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5b is a schematic top view of a hollow section end according to the embodiment of FIG. 5a;

DESCRIPTION OF THE PREFERRED EMBODIMENTS

Referring to the drawings, the devices and systems described below can be used in WIM applications. The safety of the road users, compliance with legal regulations as well as the protection and long-term preservation of the traffic infrastructure are in the focus of the dynamic weighing (weigh in motion) of vehicles. Individual vehicle data, which contain, among other things, the wheel, axle, axle group and total weights, are detected by means of axle load sensors and inductive loops installed in the pavement. In times of aging road and bridge structures and road and bridge structures in urgent need of modernization, this information is a prerequisite for estimates to detect the current and expected future traffic flows and weight loads and to preventively anticipate them.

The devices and systems described below comprise force sensors and force strip sensors, i.e., strip-shaped force sensors. A force, which acts on the sensor, is measured with a force transducer or force sensor. Both tensile and compressive forces can usually be measured due to elastic deformation. The applications include, besides the force measurement, weighing and the determination of torques. The force sensors described below may have piezoceramic elements, in which the action of a force leads to a charge distribution, which is proportional to the force. The force sensors described below may comprise piezoelectric crystals, with which forces, pressures, accelerations, expansions and torques can be measured. The force sensors described below may be designed as piezoelectric force sensors, for example, with a measuring element with at least two piezoelectric crystals with transverse effect for measuring axially acting forces and/or pressures.

The devices and systems described below comprise strip sensors. A strip sensor is a strip that comprises one or more sensors, for example, force or pressure sensors. The strip sensors described below are suitable for being installed in the surface of a roadway and for detecting the force of a vehicle traveling over it, which force acts on the road surface. The strip sensor may be designed as a weighing plate, which may be enclosed in a frame, the enclosed weighing plate acting on a force sensor that may be embedded in a housing under the weighing plate. The housing may enclose the frame, the weighing plate, the force sensor and a bottom plate air-tightly and be filled with a pressure-transmitting medium.

The strip sensors, force sensors and force strip sensors described in this disclosure may be designed, for example, such as the sensors described in more detail in the documents WO 2013/056381 A1, WO 2013/071452 A1 and EP 1 019 684 B1.

Figure 1:
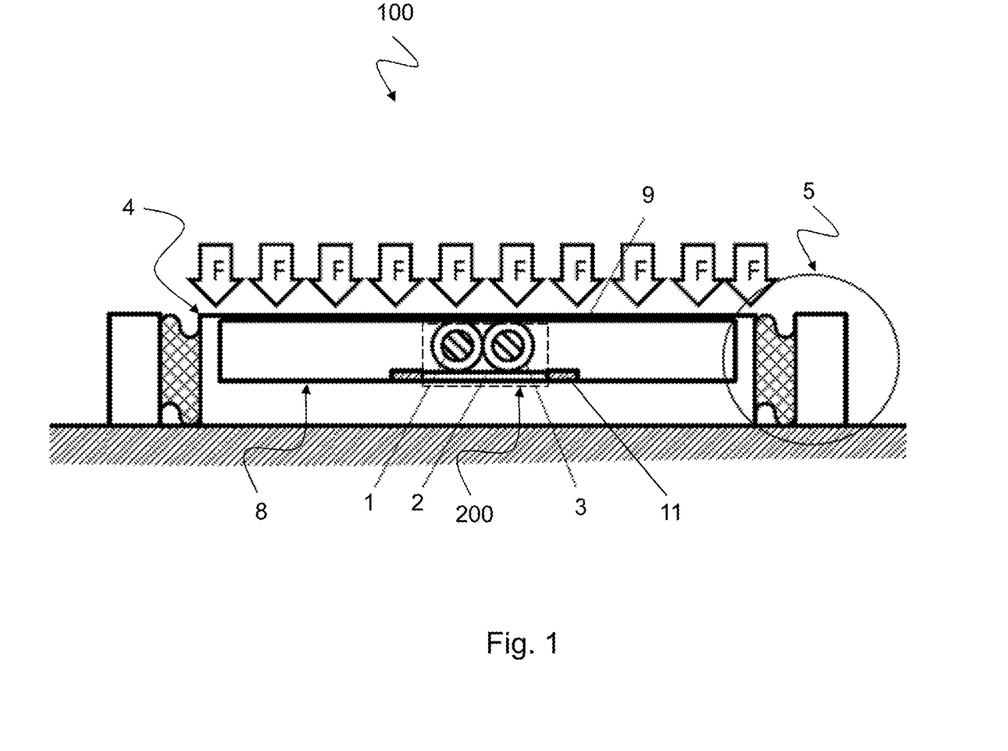
FIG. 1 is a schematic view of a strip sensor device according to one embodiment of the invention.

FIG. 1 shows a schematic view of a strip sensor device 100 according to one embodiment.

The strip sensor device 100 comprises an elongated hollow section housing 4 and a force sensor device 200, which is arranged in the hollow section housing 4 and will be described in more detail below in connection with FIG. 2. An elongated sensor mount 2 of the force sensor device 200 may extend along a longitudinal direction of the hollow section housing 4. The strip sensor device 100 may comprise a guide element 8, which is arranged in the hollow section housing 4 along the longitudinal direction of the hollow section housing 4 and can receive the force sensor device 200. The force sensor device 200 may be mounted displaceably in the guide element 8.

Figure 6A:
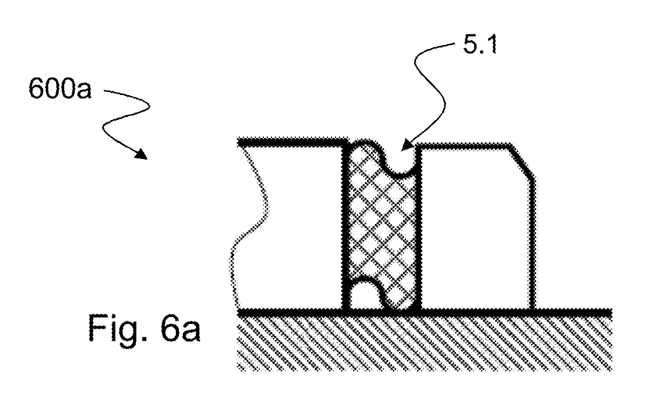
FIG. 6a is a schematic view of the edge zone of the hollow section housing 4 according to a first variant.
Figure 6B:
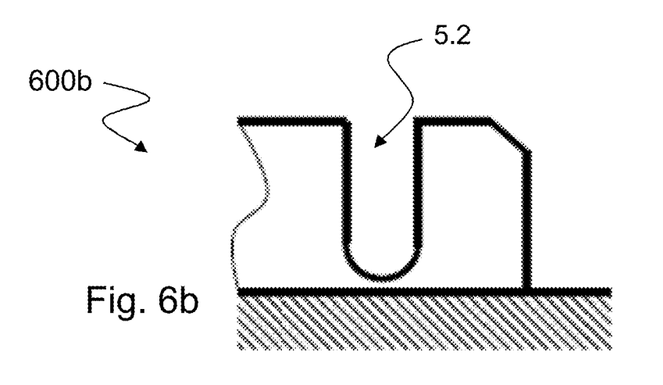
FIG. 6b is a schematic view of the edge zone 600b of the hollow section housing 4 according to a second variant.
Figure 6C:
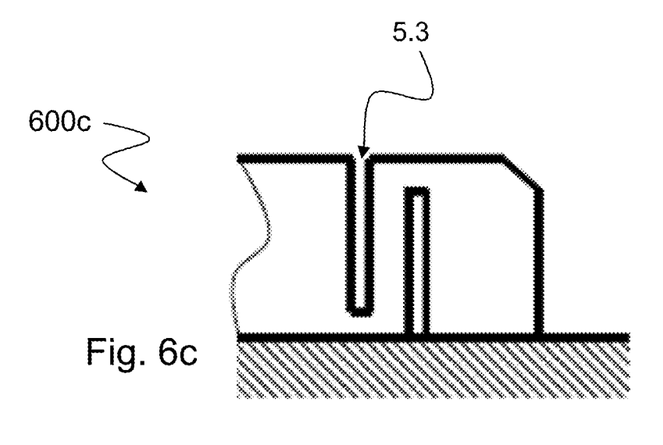
FIG. 6c is a schematic view of the edge zone 600c of the hollow section housing 4 according to a third variant.

The hollow section housing 4 may have elastic edge zones 5, for example, edge zones 5 such as those described in more detail in FIGS. 6a through 6c.

The hollow section housing 4 of the strip sensor device 100 may also receive a plurality of force sensors 200.

The strip sensor device 100 may be installed in the surface of a roadway, for example, as described below in connection with FIG. 3, and can detect the force of a vehicle traveling over it, which force acts on the surface.

The guide element 8 may be designed as a frame, which encloses a weighing plate 9, which forms the measuring zone. The force sensor device 200 may be inserted or pushed into the frame on guide rails 11 and lie under the weighing plate 9 in the pushed-in state, so that the weight of a vehicle traveling over the weighing plate 9 can be picked up by the force sensor device 200. The frame may, for example, be open on one side in order to push the force sensor device 200 into the frame from that side. The weighing arrangement comprising the force sensor device 200, the weighing plate 9 and the frame or guide element 8 with guide rails 11 may be enclosed by the hollow section housing 4 in an air- and moisture-tight manner, so that the strip sensor device 100 is not exposed to any harmful ambient effects. The hollow section housing 4 may, furthermore, be filled with a pressure-transmitting medium. The hollow section housing 4 may consist, for example, of aluminum or another light metal or plastic.

Figure 2:
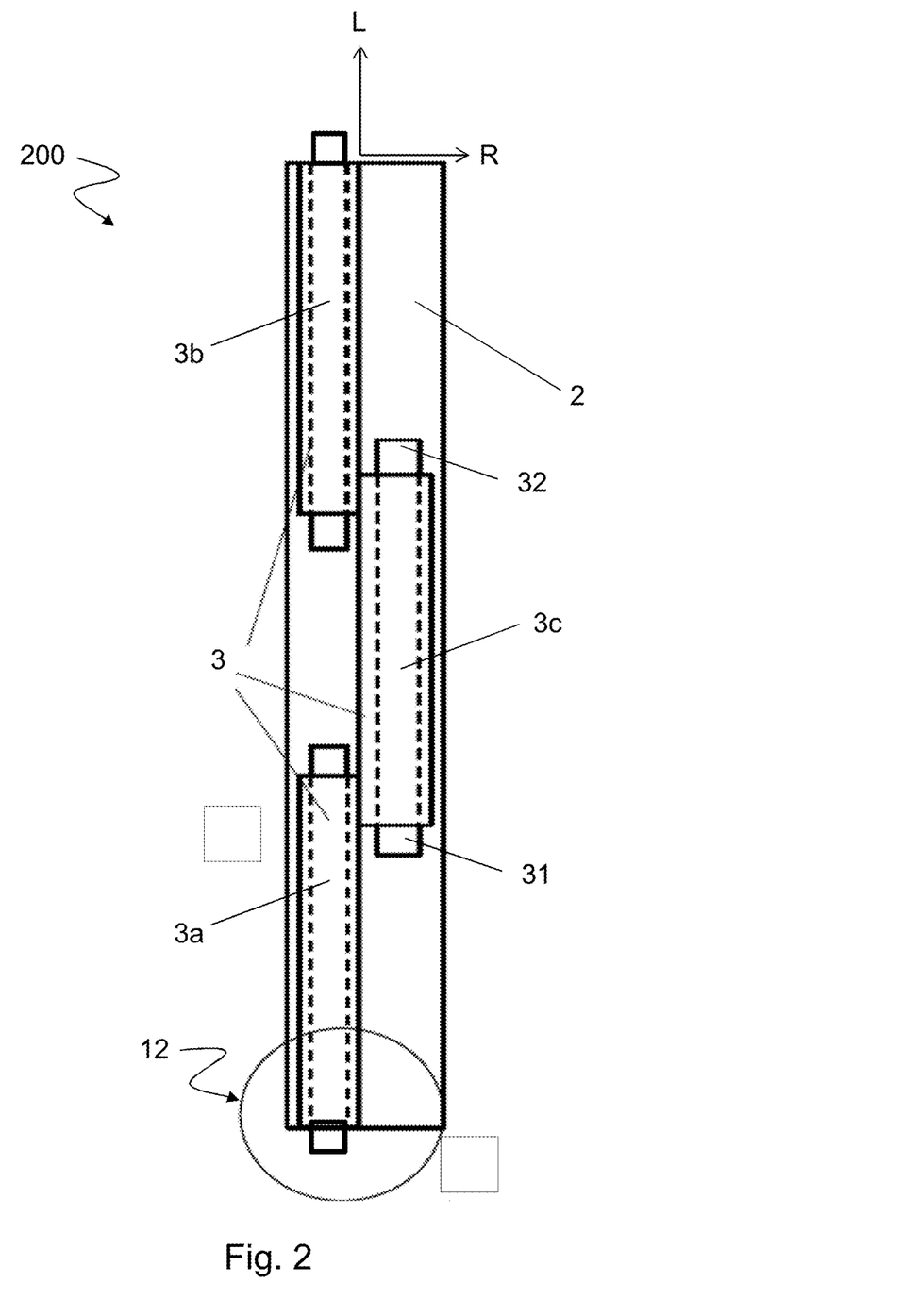
FIG. 2 is a schematic view of a force sensor device according to one embodiment of the invention.

FIG. 2 shows a schematic view of a force sensor device 200 for detecting the weight of a vehicle according to one embodiment. The force sensor device comprises an elongated sensor mount 2 and a plurality of hollow sections 3 arranged at least partially overlapping in the elongated sensor mount 2, wherein a force strip sensor 1 is arranged in each hollow section 3.

The overlappingly arranged hollow sections 3 may extend in a direction L in which the elongated sensor mount 2 extends. The sensitivity of the force strip sensors 1 along the direction L in which the elongated sensor mount 2 extends may be approximately constant. The sensitivity of the force strip sensors 1 in the radial direction R of the elongated sensor mount 2 may, by contrast, be non-uniform. The sensitivity of the force strip sensors 1 in the radial direction R may decrease, especially continuously, from a central position, i.e., a position on the longitudinal axis L shown in FIG. 2, to an edge position, i.e., in the direction of or opposite the direction of the radial axis R shown in FIG. 2. An exemplary sensitivity curve is shown in more detail in FIG. 3. The force strip sensors 1 may, for example, be inserted, pushed or bonded into the hollow sections 3.

As is shown in FIG. 2, the plurality of overlappingly arranged hollow sections 3 may have a first hollow section 3a, a second hollow section 3b and a third hollow section 3c. The first hollow section 3a and the second hollow section 3b may be arranged in a row at spaced locations from one another. The third hollow section 3c may be arranged laterally next to the first hollow section 3a and the second hollow section 3b and at least partially overlap the first hollow section 3a and the second hollow section 3b.

Figure 5A:
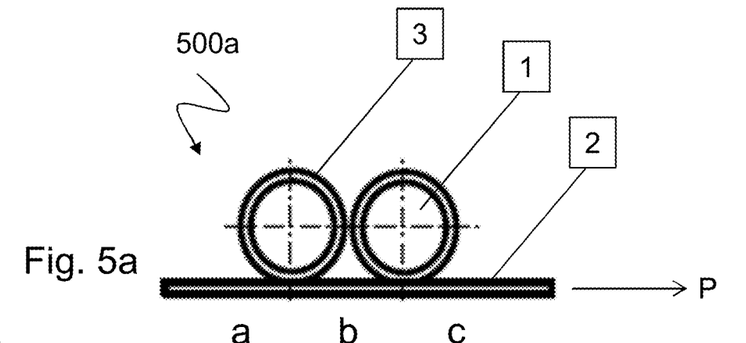
FIG. 5a is a schematic sectional view of a hollow section end according to one embodiment of the invention.
Figure 5B:
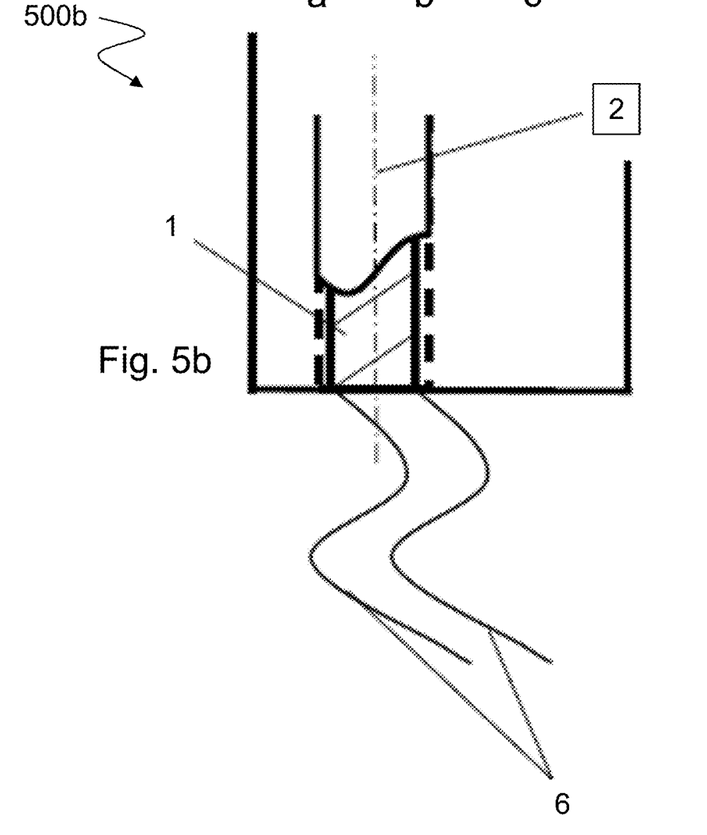

The hollow sections 3 may have connection interfaces 6 each at the two hollow section ends 31, 32 for an electrical connection of the force strip sensors 1, as is shown in greater detail, for example, in FIG. 5. The force strip sensors 1 may be connected electrically in series.

The hollow sections 3 may be formed, for example, by tubes, especially by thin-walled tubes, with a circular cross section or with a square cross section. The tubes may consist, for example, of aluminum or plastic.

The force sensor device 200 is a novel mounting and force application element, which maintains the force sensors 1 in position and at the same time defines the force application positions. The element may comprise a base plate 2 and individual, thin tubes 3, in which the force sensors 1 can be bonded. The overlaps of the tubes 3 may be selected to be such that the sensitivity remains constant at the sites at which the transitions of the two force sensors are located. The strip sensors may have any desired length due to the alternating arrangement of the tubes 3. The entire measuring element can be inserted into the hollow section in a simple manner due to the preassembly of the sensors on the mounting and force application element. The measuring element does not therefore need to be fixed rigidly on the hollow section, as this is the case with conventional products. The measuring element can be guided along the section, but it does not have to be held. Therefore, bending and torsional loads do not lead to strong forces acting on the element and the relative displacements can be compensated by slipping. This makes the element additionally more insensitive to shock type loads.

Figure 4:
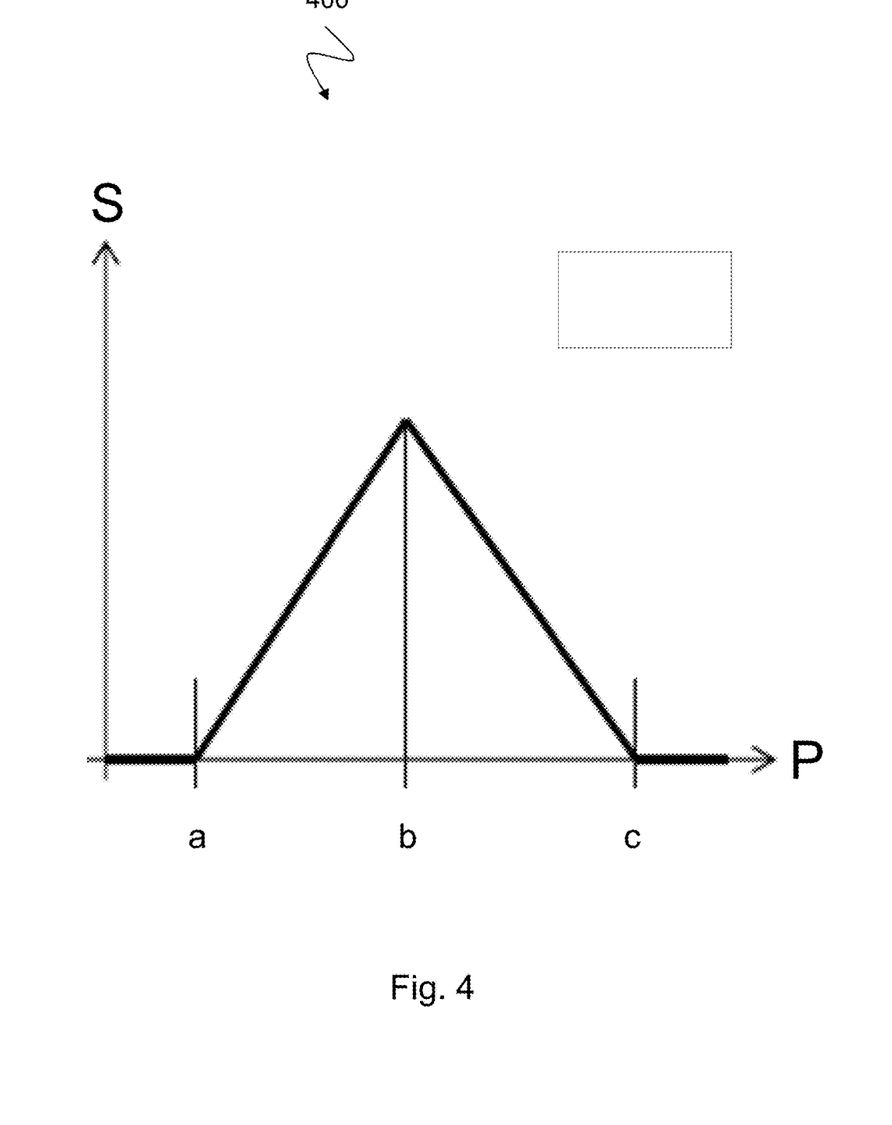
FIG. 4 is an exemplary diagram, which represents the sensitivity S of the force sensor device over position P.

The strip sensor differs, furthermore, from common solutions in that the sensitivity does not have to be uniform over the entire contact width (in the direction of travel), as is shown in more detail in FIG. 4. In addition, the hollow section may be elastic at the edge zones in order to compensate the temperature-induced stresses by differential expansions in case of installation in the surface, on the one hand, and to uncouple effects occurring with the vehicle moving over the measuring zone 9 in case of mobile application, on the other hand. The elasticity can be ensured by metallic, flexible control arms or rubber, elastomer or plastic sections, as described in more detail in FIG. 6.

Figure 3:
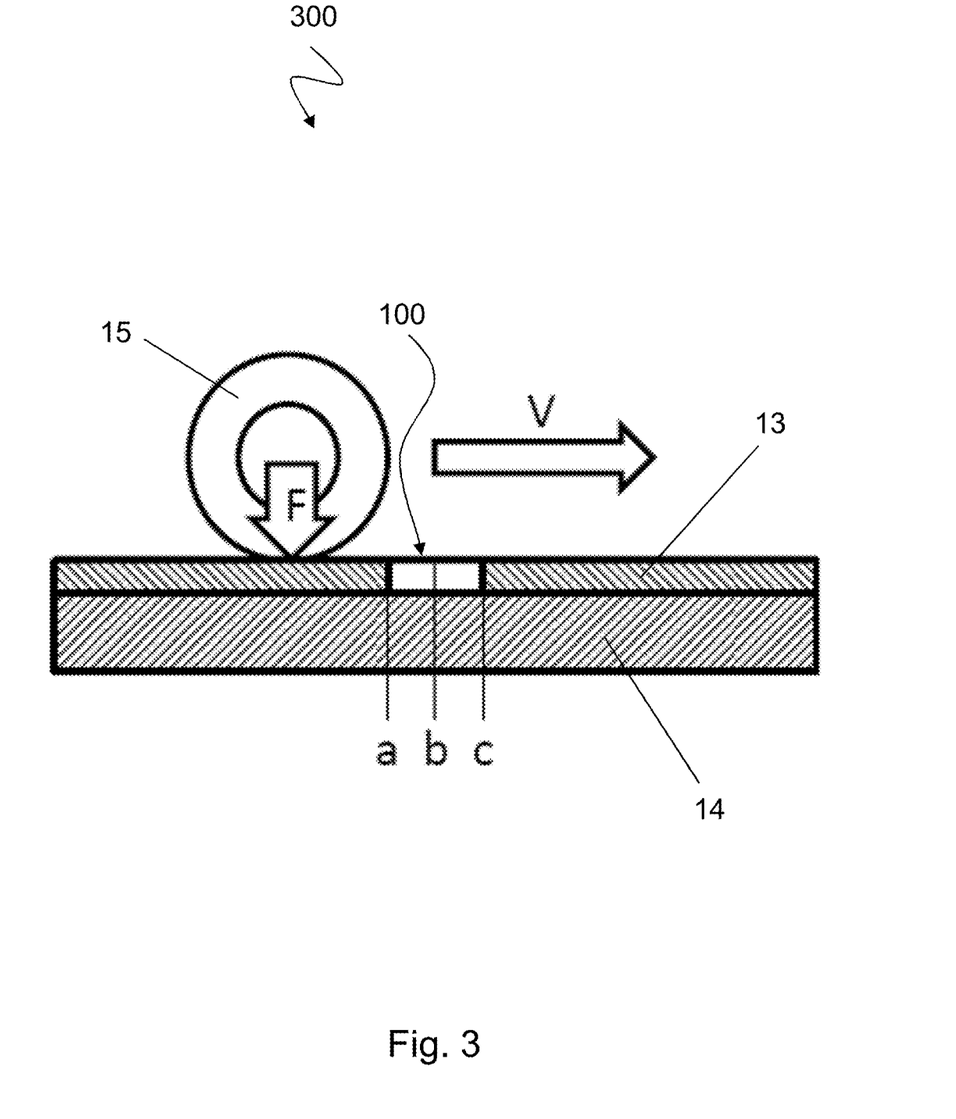
FIG. 3 is a schematic view of a system construction according to one embodiment of the invention.

FIG. 3 shows a schematic view of a system construction 300 with a strip sensor device 100 according to one embodiment. The strip sensor device 100 may be installed in the road surface 13 or the first cover layer of a road surface of a roadway or road 14, so that it forms a flat surface, over which vehicles can travel, with the road surface.

The vehicles are indicated by a vehicle wheel 15 here, which travels over the road surface 13 of the roadway 14 at a velocity V and with a wheel load F, so that the weight or partial weight of the vehicle can be measured by the strip sensor device 100.

FIG. 4 shows an exemplary diagram 400, which shows a sensitivity S of the force sensor device 200 over the position P.

The sensitivity S may depend on the position P, which is indicated along the radial axis R shown in FIG. 2. For example, a sensitivity profile with the turning points a, b and c may be obtained, as is shown in FIG. 4. The profile may increase continuously, especially linearly from point a to point b and decrease continuously, especially linearly from point b to point c. Other sensitivity profiles, for example, sinusoidal, bell-shaped, serrated or even rectangular profiles, are also possible, in addition to a triangular profile.

FIGS. 5a/b show a schematic view of a hollow section end 500a, 500b in a sectional view (FIG. 5a) and in a top view (FIG. 5b) according to one embodiment.

FIG. 5a shows an enlarged view of the edge area 12 of the force sensor device 200, which device is shown in FIG. 2, in a sectional view. The hollow sections 3, in which a respective force strip sensor 1 is arranged and which are arranged on the sensor mount 2 or bottom plate, are arranged on the elongated sensor mount 2 or bottom plate. Only two hollow sections 3, which are arranged on the bottom plate 2 offset in relation to one another, can be seen because of the sectional view.

FIG. 5b shows an enlarged top view of the edge area 12 of the force sensor device 200 shown in FIG. 2. The hollow sections 3 have respective connection interfaces 6 for the electrical connection of the force strip sensors 1 at both hollow section ends. The force strip sensors 1 can be connected electrically in series with the connection interfaces 6.

FIG. 6a shows a schematic view of the edge zone 600a of the hollow section housing 4 according to a first variant. The edge zone 600a is an embodiment variant of the edge zone 5 of the strip sensor device 100 shown in FIG. 1. The edge zone 600a may comprise a flexible control arm, which consists, for example, of metal, or be embodied as rubber, elastomer or plastic sections. The edge zone 600a may comprise one or more sinusoidal expansion joints 5.1, which ensure the required elasticity.

FIG. 6b shows a schematic view of the edge zone 600b of the hollow section housing 4 according to a second variant. The edge zone 600b is an embodiment variant of the edge zone 5 of the strip sensor device 100, which edge zone 5 is shown in FIG. 1. The edge zone 600b may comprise a flexible control arm, which consists, for example, of metal, or be embodied as rubber, elastomer or plastic sections. The edge zone 600b may comprise one or more U-shaped expansion joints 5.2, which ensure the required elasticity.

FIG. 6c shows a schematic view of the edge zone 600c of the hollow section housing 4 according to a third variant. The edge zone 600c is an embodiment variant of the edge zone 5 of the strip sensor device 100, which said edge zone 5 is shown in FIG. 1. The edge zone 600c may comprise a flexible control arm, which may consist, for example, of metal, or be embodied as rubber, elastomer or plastic sections. The edge zone 600c may comprise one or more rectangular expansion joints 5.3, which ensure the required elasticity. A combination of expansion joints of different shapes, for example, such with a sinusoidal shape, U shape and rectangular shape, is also possible.

It is apparent that the features of the different embodiments described here as examples can be combined with one another, unless specified otherwise. As is shown in the description and the drawings, individual elements, which are represented as being connected, do not have to be directly connected with one another; intermediate elements may be provided between the connected elements. Furthermore, it is apparent that embodiments of the present invention may be implemented in individual circuits, partially integrated circuits or fully integrated circuits or programming means. The term "for example" is meant only as an example rather than as the best or the optimal. Certain embodiments were illustrated and described here, but it is apparent to the person skilled in the art that a plurality of alternative and/or similar implementations may be embodied instead of the embodiments being shown and described, without departing from the concept of the present invention.

While specific embodiments of the invention have been shown and described in detail to illustrate the application of the principles of the invention, it will be understood that the invention may be embodied otherwise without departing from such principles.

What is claimed is:

1. A force sensor device for detecting a weight of a vehicle, the force sensor device comprising:
    an elongated sensor mount extending in a longitudinal direction;
    a plurality of hollow sections arranged on the elongated sensor mount as overlappingly arranged adjacent hollow sections, with the adjacent hollow sections only partially overlapping each other in the longitudinal direction of the elongated sensor mount to form a force sensor device measuring extent, wherein each of the overlappingly arranged adjacent hollow sections, arranged on the elongated sensor mount, has a non-overlapping length, in the longitudinal direction, wherein along each non-overlapping length there is no overlap of each of said overlappingly arranged adjacent hollow sections with any other of the plurality of hollow sections arranged on the elongated sensor mount; and a force strip sensor arranged in each of the hollow sections.

2. A force sensor device in accordance with claim 1, wherein the overlappingly arranged adjacent hollow sections each extend in the longitudinal direction in which the elongated sensor mount extends and at least partially do not overlap each other in the longitudinal direction.

3. A force sensor device in accordance with claim 2, wherein a sensitivity of each force strip sensor is approximately constant along the longitudinal direction in which the elongated sensor mount extends.

4. A force sensor device in accordance with claim 2, wherein a sensitivity of the force strip sensors is non-uniform in a radial direction of the elongated sensor mount.

5. A force sensor device in accordance with claim 4, wherein the sensitivity of the force strip sensors decreases continuously in the radial direction of the elongated sensor mount from a central position to an edge position.

6. A force sensor device in accordance with claim 1, wherein the force strip sensors are inserted into the hollow sections and are held in the hollow sections by non-positive connection or positive-locking connection.

7. A force sensor device in accordance with claim 1, wherein:
the plurality of overlappingly arranged adjacent hollow sections comprise a first hollow section, a second hollow section and a third hollow section;
the first hollow section and the second hollow section are arranged in a row at spaced locations from one another;
the third hollow section is arranged laterally next to the first hollow section and the second hollow section and at least partially overlaps the first hollow section and at least partially overlaps the second hollow section.

8. A force sensor device in accordance with claim 1, wherein the hollow sections have connection interfaces at each of hollow section ends, the connection interfaces for the electrical connection of the force strip sensors.

9. A force sensor device in accordance with claim 1, wherein the force strip sensors are connected electrically in parallel or in series.

10. A force sensor device in accordance with claim 1, wherein the hollow sections are formed by thin-walled tubes, with one of a circular cross section and a square cross section.

11. A strip sensor device comprising:
an elongated hollow section housing; and
a force sensor device arranged in the hollow section housing, the force sensor device comprising:
an elongated sensor mount extending in a longitudinal direction;
a plurality of overlapping tubular hollow sections arranged on the elongated sensor mount to form a force strip sensor extent along the longitudinal direction continuing from a first location along the longitudinal direction to a second location along the longitudinal direction, the plurality of overlapping tubular hollow sections comprising longitudinally adjacent tubular hollow sections separated by a distance along the longitudinal direction and at least one laterally adjacent tubular hollow section separated laterally from the longitudinally adjacent tubular hollow sections and bridging, in the longitudinal direction, the distance separating the longitudinally adjacent tubular hollow sections and with an end of the laterally adjacent tubular hollow section partially overlapping a longitudinal extent of each of the longitudinally adjacent tubular hollow sections in the longitudinal direction of the elongated sensor mount to define a longitudinal non-overlapping length, in the longitudinal direction, of each of the longitudinally adjacent tubular hollow sections, wherein along the longitudinal non-overlapping length of each of the longitudinally adjacent tubular hollow sections, there is no overlap of each of the longitudinally adjacent tubular hollow sections with any other of the overlapping tubular hollow sections arranged on the elongated sensor mount and to define a longitudinal non-overlapping length, in the longitudinal direction, of the at least one laterally adjacent tubular hollow section, wherein along the longitudinal non-overlapping length of the at least one laterally adjacent tubular hollow section, there is no overlap of the at least one laterally adjacent tubular hollow section with any other of the overlapping tubular hollow sections arranged on the elongated sensor mount; and a force strip sensor arranged in each of the hollow sections.

12. A strip sensor device in accordance with claim 11, further comprising a guide element arranged in the hollow section housing along the longitudinal direction of the hollow section housing, wherein the at least one force sensor device is mounted displaceably in the guide element.

13. A strip sensor device in accordance with claim 11, wherein the hollow section housing has elastic edge zones.

14. A strip sensor device in accordance with claim 13, wherein the elastic edge zones of the hollow section housing have expansion joints with one of a sinusoidal shape, U-shape and rectangular shape.

15. A strip sensor device in accordance with claim 11, wherein:
a sensitivity of the force strip sensors is approximately constant along the longitudinal direction in which the elongated sensor mount extends; and
a sensitivity of the force strip sensors is non-uniform in a radial direction of the elongated sensor mount.

16. A strip sensor device in accordance with claim 15, wherein the sensitivity of the force strip sensors decreases continuously in the radial direction of the elongated sensor mount from a central position to an edge position.

17. A strip sensor device in accordance with claim 11, wherein:
the hollow sections have connection interfaces at each of hollow section ends, the connection interfaces for the electrical connection of the force strip sensors; and
the force strip sensors are connected electrically in parallel or in series.

18. A strip sensor device comprising:
an elongated hollow section housing; and
a force sensor device arranged in the hollow section housing, the force sensor device comprising:
an elongated sensor mount extending in a longitudinal direction of the force sensor device;
a plurality of tubular hollow sections arranged in the elongated sensor mount with each extending, at least partially, in the longitudinal direction in which the elongated sensor mount extends, and with the plurality of tubular hollow sections together extending from a first connection interface end to a second connection interface end, the plurality of hollow sections comprising a first tubular hollow section, a second tubular hollow section and a third tubular hollow section, wherein the first tubular hollow section and the second tubular hollow section are arranged longitudinally adjacent to each other and at spaced locations from one another in a row and the third tubular hollow section is arranged laterally adjacent to the first tubular hollow section and laterally adjacent to the second tubular hollow section and the third tubular hollow section partially overlaps the first tubular hollow section in the longitudinal direction of the elongated sensor mount and the third tubular hollow section partially overlaps the second tubular hollow section in the longitudinal direction of the elongated sensor mount to define a longitudinal first tubular hollow section non-overlapping length, in the longitudinal direction, wherein along the longitudinal first tubular hollow section non-overlapping length there is no overlap of the first tubular hollow section with any other of the plurality of tubular hollow sections arranged in the elongated sensor mount and to define a longitudinal second tubular hollow section non-overlapping length, in the longitudinal direction, wherein along the longitudinal second tubular hollow section non-overlapping length there is no overlap of the second tubular hollow section with any other of the plurality of tubular hollow sections arranged in the elongated sensor mount and to define a longitudinal third tubular hollow section non-overlapping length, in the longitudinal direction, wherein along the longitudinal third tubular hollow section non-overlapping length there is no overlap of the third tubular hollow section with any other of the plurality of tubular hollow sections arranged in the elongated sensor mount;

a force strip sensor arranged within the first tubular hollow section for an electrical connection at each of the first connection interface end and at the second connection interface end of the first tubular hollow section;

a force strip sensor arranged within the second tubular hollow section for an electrical connection at each of the first connection interface end and at the second connection interface end of the second tubular hollow section; and a force strip sensor arranged within the third tubular hollow section for an electrical connection at each of the first connection interface end and at the second connection interface end of the third tubular hollow section.

* * * * *